United States Patent [19]
Al et al.

[11] 3,958,595
[45] May 25, 1976

[54] CORROSION RESISTANT VALVE CONSTRUCTION

[75] Inventors: René J. Al, Bradford; Ralph E. Henry, Rixford, both of Pa.

[73] Assignee: Dresser Industries, Inc., Dallas, Tex.

[22] Filed: Nov. 22, 1974

[21] Appl. No.: 526,209

[52] U.S. Cl. ............................ 137/375; 29/157.1 R; 251/305; 427/239
[51] Int. Cl.² .......................................... F16K 1/22
[58] Field of Search ............ 137/375; 251/305, 306, 251/286, 309, 366; 29/156.7 R, 157.1 R; 427/235, 239, 355, 358

[56] References Cited
UNITED STATES PATENTS

| | | | |
|---|---|---|---|
| 1,840,904 | 1/1932 | Julien .................................. | 137/375 |
| 1,939,495 | 12/1933 | Goecke .............................. | 137/375 |
| 1,998,882 | 4/1935 | Merrill ............................... | 137/375 |
| 2,454,160 | 11/1948 | Greene .............................. | 137/375 |
| 3,406,707 | 10/1968 | Schenck, Jr. ...................... | 137/375 |
| 3,425,439 | 2/1969 | Duffey et al. ...................... | 137/375 |
| 3,508,573 | 4/1970 | Smith ................................. | 137/375 |
| 3,661,171 | 5/1972 | Smith et al. ....................... | 137/375 |
| 3,750,698 | 8/1973 | Walchle ............................. | 137/375 |
| 3,778,028 | 12/1973 | Graves et al. ..................... | 137/375 X |

*Primary Examiner*—Martin P. Schwadron
*Assistant Examiner*—Robert J. Miller
*Attorney, Agent, or Firm*—Daniel Rubin

[57] ABSTRACT

A valve, such as a butterfly valve having an offset closure vane and a thru shaft for operating the vane in the flow passage of the body, has all exposed and/or potentially vulnerable metal surfaces encapsulated in a corrosion resistant polymeric plastic coating. By extending the coating uninterrupted from the flow passage through the shaft bore and sizing the bore coating to within controlled tolerances, overall corrosion protection of the valve is substantially enhanced while enabling the coating per se to function as a bearing surface for the operator shaft.

11 Claims, 3 Drawing Figures

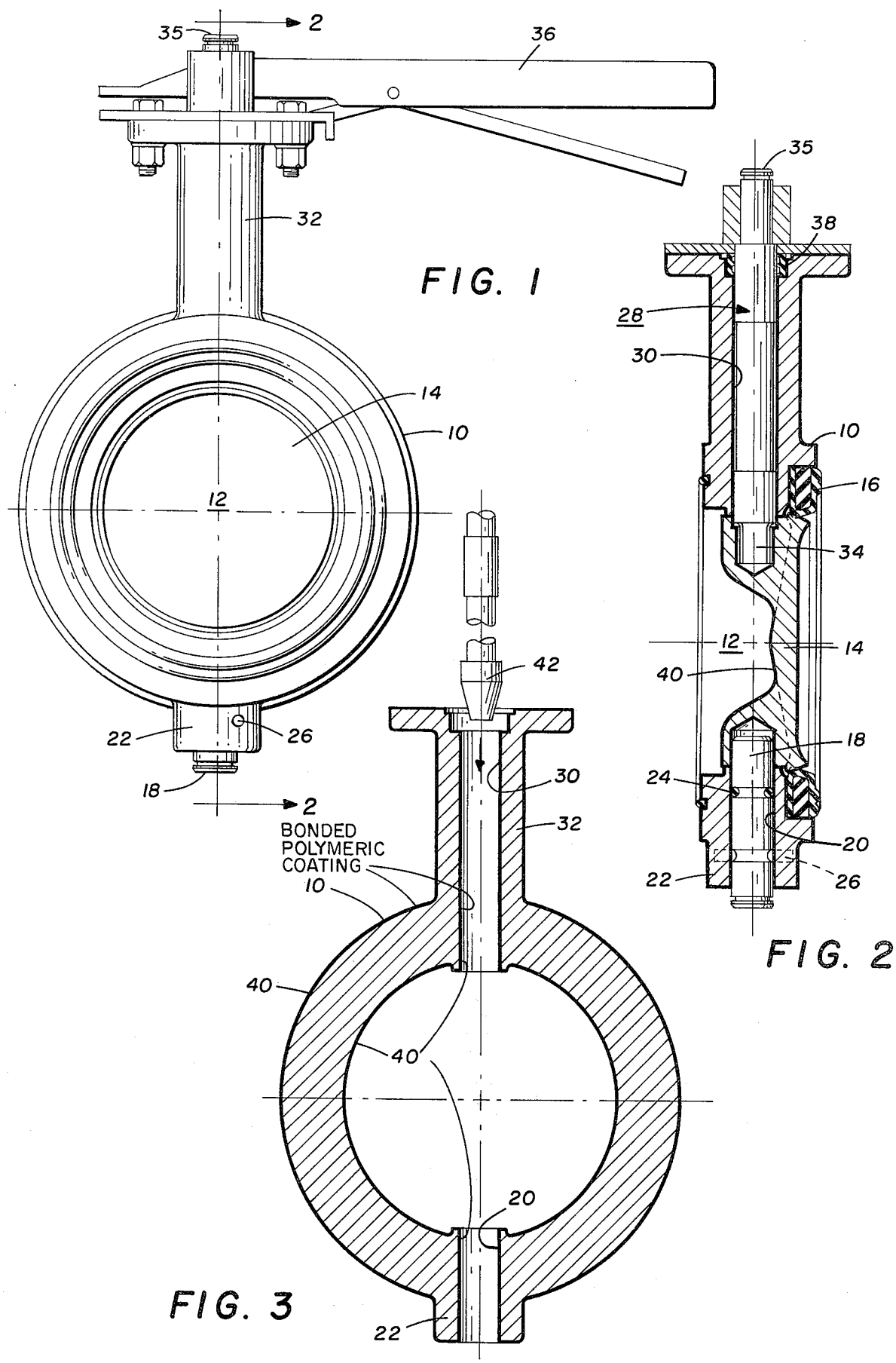

CORROSION RESISTANT VALVE CONSTRUCTION

BACKGROUND OF THE INVENTION

1. The field of art to which the invention pertains comprises the art of valves including liners and protectors therefor.

2. The prior art to which the invention is directed includes the art of valves and particularly butterfly valves being a type in which a usually circular closure vane or disc is mounted either centralized or offset for rotation in the body flow passage between an open and closed position. ion. Construction for such valves commonly consists of a body and/or closure vane of cast iron or the like operable by means of an operator shaft extending through a bore in the body wall to externally thereof. Where the valve is likely to be utilized in corrosive service, the more corrosion vulnerable components and sometimes the entire valve is constructed of more exotic and more expensive materials such as stainless steel. As an alternative less costly construction, a recent trend in the industry has been to apply either a protective polymeric coating and/or a detachable liner about those components or surface portions susceptible to corrosive attack by the line content of the piping system in which the valve is to be used. Exemplifying such prior art type butterfly valves for corrosive service of both the centralized and offset variety are U.S. Pat. Nos. 3,801,066; 3,563,510; 3,425,439; 3,376,014; 3,241,806; and 3,076,631.

Notwithstanding the added benefits which such protective coatings or liners afford, a problem which has thus far escaped a ready solution has been satisfactory corrosion protection for the body bore containing the operator shaft. The problem is particularly acute with the offset or double offset variety of vane mounting in a butterfly valve as compared to a centralized mounting because of the increased exposure and vulnerability afforded the shaft bore in the former. Where a dynamic seal is employed to protect the shaft bore, the risk of leakage is minimized but not eliminated rendering the bore surface ultimately vulnerable to attack. Being at an interior location within the valve body, it has not been previously practical to coat the bore surface with any degree of reliable continuity while at the same time maintaining required tolerances necessary to avoid binding or other interference with rotation of the operator shaft. Yet, failure to protect the bore surface in one form or another will eventually lead to destruction of the valve. For that reason and for lack of a less costly alternative, a frequent construction for such service has been the combination of a stainless steel body with a rubber boot or the like which seals the shaft hole from the line content.

SUMMARY OF THE INVENTION

The invention relates to valves and more particularly to butterfly valves for corrosion resistant service. In accordance with the construction hereof, a continuous plastic coating of corrosive resistant composition is completely bonded to the valve body throughout, including the shaft bores containing the trunnion shafts for supporting and operating the offset or double offset closure vane between open and closed positions. Not only is overall corrosion protection reliably enhanced in this manner as to eliminate previous need for complex seals with or without stainless steel body construction, but at the same time by carefully sizing the bore coating within controlled diametral tolerances, the coating per se is enabled to also function as a bearing for the operator shaft. The virtues thereof should be instantly apparent in both the enhanced protection and reduced cost of manufacture which this construction affords as compared to previous constructions utilized for such purposes.

It is therefore an object of the invention to provide a novel valve construction for corrosive line service.

It is a further object of the invention to provide a novel valve construction for a trunnion operated valve in which the valve body is completely encapsulated with a bonded polymeric coating affording corrosive protection and which extends uninterrupted through the body bores supporting the trunnion shafts.

It is a further object of the invention to effect the previous object with a coating in the operator shaft bore of controlled size also able to function per se as a journal bearing for the shaft.

It is a still further object of the invention to effect the foregoing objects with a relatively uncostly, easily applied construction for readily achieving the reliable long-life corrosion protection that such valves require.

BRIEF DESCRIPTION OF THE DRAWINGS

FIG. 1 is a front elevation of wafer-type butterfly valve in accordance herewith;

FIG. 2 is a sectional view taken substantially along the lines 2—2 of FIG. 1; and FIG. 3 is an enlarged sectional view of the valve body illustrating the coating procedure for the shaft bores thereof.

Referring now to the drawings, there is illustrated a wafer-type butterfly valve formed of a cast iron ring-like body 10 defining a central flow passage 12. Contained within passage 12 is an offset or double offset closure vane 14 mounted for rotation on trunnion stub shafts 18 and 28. For closing the passage to fluid flow, vane 14 cooperates with an annular resilient gasket seal 16 in a well known manner.

Supporting vane 14 at the underside of the valve is stationary stub shaft 18 contained in body bore 20 extending outward through boss 22. A static seal 24 seals against possible leakage therepast while a cross pin 26 transversely extending through shaft 18 secures it in position and against inadvertent rotation.

Supporting vane 14 on its topside is an operator shaft 28 extending from a rotational interlock with the vane through bore 30 of integral body neck 32 to outward thereof. Shaft 28 is preferably of stainless steel or other corrosion resistant construction and at its underside 34, where rotationally interlocking with the vane, is of hexagonal or other suitable cross section able to effect a driving connection therewith. At its top end 35, shaft 28 is sectionally shaped to accommodate a suitable operator 36 whereby the valve can be manually or power opened or closed as required. A dynamic seal 38 about shaft 28 precludes line content leakage therepast.

In accordance with the invention hereof, the entire body and vane are provided with a moisture impervious, resilient, polymeric coating 40 bonded to the metal surfaces. Coating 40, usually on the order of about 8 to 10 mils in thickness, can comprise either a thermoplastic or thermosetting composition characterized by good chemical and impact resistance and may include such polymeric compositions as nylon, polyethylene, polypropylene, polyurethane, polyvinyl chloride (PVC) or the like. For purposes hereof, nylon has been found preferable. To apply the coating such known techniques as fluidized bed, electrostatic spray or combinations thereof may be employed effecting normally variable thickness throughout.

For coating shaft bores 20 and 30, it is applied simultaneously and formed thereat concomitantly with the coating applied elsewhere. Initially, the coating effects an undersized bore diameter of about 0.010 to 0.015 inch thickness. Thereafter, while body 10 is relatively cold and with the coating in a cured or semi-cured condition, a heated mandrel 42 smooth surfaced and of controlled O.D. dimension slightly undersized of the final bore diameter is gradually and carefully inserted through the shaft holes from inward through bore 30 to outward of bore 20. In this manner, each bore is sized to a very accurate diameter on the order of about ±0.001 inches while its surfaces are reduced to an ultra smooth bearing finish without otherwise disturbing the complete encapsulation elsewhere on the body. Where the coating is of a nylon composition, mandrel 42 is pre-heated to approximately 900° F. to effect the foregoing.

By the above description there is disclosed a novel valve construction for corrosive line service which substantially enhances the corrosion protection while at the same time reducing fabrication costs as compared to similar purpose constructions of the prior art. While simple in principle, the results are highly reliable in affording the combination of both increased corrosion protection and bearing surface for a trunnion mounted offset or double offset valve. By virtue of the latter, need for loose bearings or other form of bearing support to absorb shaft loads imposed during opening and closing of the valve is eliminated. Whereas the invention has been described herein as particularly useful in offset or double offset valves of the butterfly type, it should be readily apparent that it can be utilized elsewhere in other valve types for which similar benefits are to be sought.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a butterfly valve for corrosive service including a metal body defining a flow passage between an inlet and an outlet, a trunnion mounted closure member in said passage operable between open and closed positions thereof, an operator shaft extending from a driving connection with said closure member to a location external of said body, and means defining at least one bore through a wall of said body for accommodating said operator shaft, a corrosion resistant coating bonded to at least the corrosion vulnerable internal surfaces of said body including the surfaces of said bore for at least a substantial portion of the bore length, said bore coating being sized to within controlled dimensions and capable of carrying the bearing load of said operator shaft.

2. In a valve according to claim 1 in which said coating extends uninterrupted from a location interior of said passage through the entire length of said bore.

3. In a pipe line valve for corrosive service including a metal body defining a flow passage between an inlet and an outlet, a closure member in said passage operable between open and closed positions thereof, an operator shaft extending from a driving connection with said closure member to a location external of said body, and means defining at least one bore through a wall of said body for accommodating said operator shaft, the method of applying corrosion protection to at least the corrosion vulnerable internal surfaces of said body including the surfaces of said bore for at least a substantial portion of the bore length comprising the steps of forming a corrosion resistant polymeric coating bonded to said surfaces and sizing the coating in said bore by passing a heated mandrel therethrough.

4. In a pipe line valve according to claim 3 in which said sizing step is performed while the bore coating is in at least a semi-cured state.

5. In a pipe line valve according to claim 4 in which said coating is of a nylon composition.

6. In a pipe line valve for corrosive service including a metal body defining a flow passage between an inlet and an outlet, a closure member in said passage operable between open and closed positions thereof, an operator shaft extending from a driving connection with said closure member to a location external of said body, and means defining at least one bore through a wall of said body for accommodating said operator shaft, a corrosion resistant coating bonded to at least the corrosion vulnerable internal surfaces of said body including the surfaces of said bore for at least a substantial portion of the bore length, said bore coating being smooth and sized to within controlled tolerances to enable functioning as a bearing for said operator shaft.

7. In a valve according to claim 6 in which the closure member is trunnion mounted, there is defined a second bore aligned and opposite said operator shaft bore and said coating extends into said second bore for at least a substantial portion of its length.

8. In a valve according to claim 7 in which said valve comprises a butterfly valve, said closure member comprises a rotatable vane, and said operator shaft is rotatable in its bore for operating said vane between said open and closed positions.

9. In a valve according to claim 8 in which said vane is operably offset from the axis of its trunnion mount.

10. In a valve according to claim 9 in which said composition comprises nylon.

11. In a valve according to claim 8 in which said coating is of a polymeric composition.

* * * * *